United States Patent [19]
Lang et al.

[11] Patent Number: 5,583,703
[45] Date of Patent: Dec. 10, 1996

[54] MOTOR VEHICLE REAR VIEW MIRROR

[75] Inventors: Heinrich Lang, Ergersheim; Wolfgang Seiboth, Bad Windsheim, both of Germany

[73] Assignee: Mekra Rangau Plastics GmbH & Co. KG, Germany

[21] Appl. No.: 317,192

[22] Filed: Oct. 3, 1994

[30] Foreign Application Priority Data

Nov. 18, 1992 [DE] Germany .................. 43 39 279.2

[51] Int. Cl.⁶ .................................................. G02B 7/182
[52] U.S. Cl. ...................... 359/877; 359/874; 359/875; 248/481; 248/484; 428/475.2
[58] Field of Search ..................... 359/601, 602, 359/604, 607, 877, 865, 871, 872, 874, 875, 876, 843; 248/481, 484; 428/475.1

[56] References Cited

U.S. PATENT DOCUMENTS

| | | | |
|---|---|---|---|
| 3,407,683 | 10/1968 | Liedel | 248/481 |
| 3,609,014 | 9/1971 | Kurz, Jr. | 359/874 |
| 4,076,392 | 2/1978 | Suzuki et al. | 348/481 |
| 4,344,672 | 8/1982 | Bleiweiss et al. | 359/871 |
| 4,403,829 | 9/1983 | Thujiuchi et al. | 359/874 |
| 4,572,626 | 2/1986 | Suzuki | 359/877 |
| 4,957,359 | 2/1990 | Kruse et al. | 359/877 |
| 4,991,950 | 2/1991 | Lang et al. | 359/877 |
| 5,110,196 | 5/1992 | Lang et al. | 359/874 |
| 5,274,505 | 12/1993 | Nagayama et al. | 359/874 |

FOREIGN PATENT DOCUMENTS

| | | |
|---|---|---|
| 0306728A1 | 11/1988 | European Pat. Off. . |
| 0342412A1 | 11/1989 | European Pat. Off. . |
| 0222064 | 6/1991 | European Pat. Off. . |
| 1208514 | 10/1970 | United Kingdom . |
| 1351350 | 4/1974 | United Kingdom . |
| 1517601 | 7/1978 | United Kingdom . |
| 1532065 | 10/1978 | United Kingdom . |

OTHER PUBLICATIONS

EPO Search Report for EP 9411 4594. (EPO 9411 4594 is a parallel application to U.S. 08/317,192).

Primary Examiner—Paul M. Dzierzynski
Assistant Examiner—Mohammad Y. Sikder
Attorney, Agent, or Firm—Laff, Whitesel, Conte & Saret, Ltd.

[57] ABSTRACT

A motor vehicle rear view mirror comprising a housing, a mirror glass support supported by a pivot joint disposed in the housing to be pivotable relative to the housing and a mirror glass disposed on the mirror glass support. The mirror glass support defines an installation chamber sized to hold at least one servomotor for the remote-controlled pivotable adjustment of the mirror glass support and thus of the mirror glass relative to the housing.

18 Claims, 8 Drawing Sheets

MOTOR VEHICLE REAR VIEW MIRROR

BACKGROUND OF THE INVENTION

1. Field of the Invention

The invention relates to a rear view mirror for motor vehicles, in particular for commercial vehicles, comprising a housing, a mirror glass support supported by means of a pivot joint disposed in the housing to be pivotable relative to the housing, and a mirror glass disposed on the mirror glass support.

2. Background Art

A rear view mirror of the generic type is known from U.S. Pat. No. 3,609,014. In this case, a pivot bearing in the form of an articulation ball fixed to the housing is disposed in the housing of the mirror, a substantially plate-shaped mirror glass support pivotally lodging on the articulation ball by means of a corresponding universal ball joint. A mirror glass is fixed on the mirror glass support and is adjustable by pivoting the mirror glass support relative to the housing.

In the prior art rear view mirror, a servomotor is provided between the mirror glass support and the housing, coupled to the mirror glass support by way of a spindle drive, which ensures a remote controlled pivotal adjustment of the mirror glass support and consequently of the mirror glass in relation to the housing.

In this prior art rear view mirror it is of disadvantage that the servomotor is disposed deep inside the housing between the latter's rear and the mirror glass support. As a result, the mounting of the servomotor is difficult and the rear view mirror offers little in terms of convenience of repair, for instance in the case of a defect of the servomotor, since the entire mirror glass support must be detached, which is accompanied by the release of the pivot joint union and the spindle drive coupling.

Further, the construction disclosed in the afore-mentioned U.S. patent is not fit to be used as a simple version without the servomotor. For, as a result of its structure, the pivot joint is comparatively unstable so that the spindle drive coupled with the servomotor is needed for additional stabilization of the mirror glass support.

SUMMARY OF THE INVENTION

It is the object of the invention to further develop a rear view mirror of the generic type such that servomotors are particularly easy to mount or to retrofit and the rear view mirror is convenient to repair.

This object is attained in that the mirror glass support is a hollow defining an installation chamber, into which at least one servomotor is installable for the remote-controlled pivotal adjustment of the mirror glass support and thus of the mirror glass in relation to the housing. The mirror glass support being embodied as a hollow, this provides for a particularly easily accessible installation chamber of exposed arrangement for the accommodation of servomotors, which, in keeping with the object according to the invention, ensures the convenience of mounting and repair of the rear view mirror according to the invention. Moreover, this design offers the prerequisites for the rear view mirror according to the invention to be realized, in the way of a unit assembly system, as a manually adjustable mirror by omitting the servomotors in a simple version, or as a remote-controlled adjustable mirror by placing servomotors in the installation chamber of the mirror glass support in a luxury version.

Further features, details and advantages of the invention will become apparent from the sub-claims and the ensuing description of examples of embodiment of the subject matter of the invention taken in conjunction with the drawings.

DESCRIPTION OF THE PREFERRED EMBODIMENTS

Figure 1:
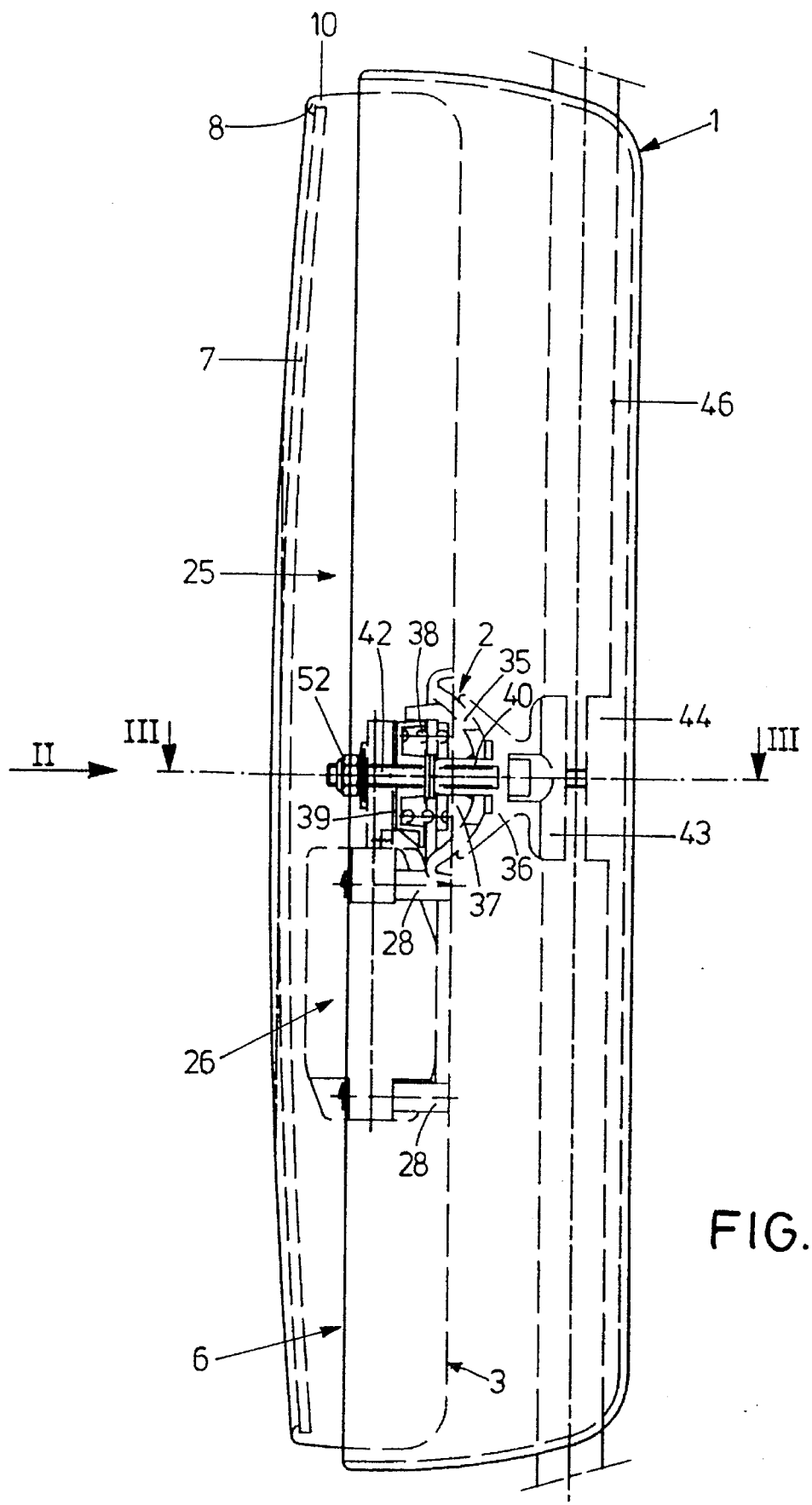
FIG. 1 is a lateral view of a first embodiment of a rear view mirror according to the invention.
Figure 2:
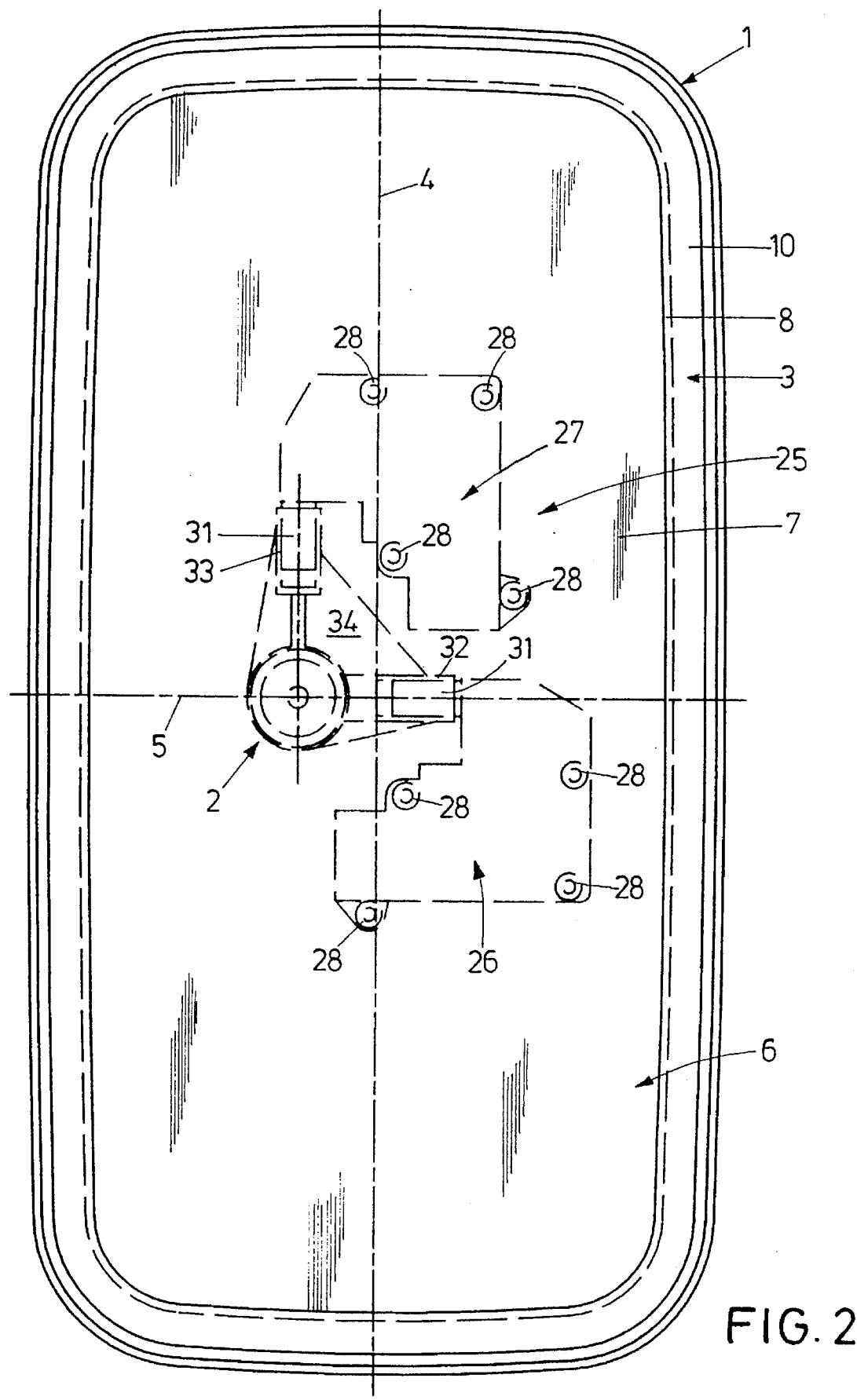
FIG. 2 is a view of the mirror from the direction of the arrow II in accordance with FIG. 1.

The three embodiments of a rear view mirror according to the invention shown in FIGS. 1 to 8 have a housing 1 (FIG. 1 to 4) and 1' (FIG. 5 to 8), respectively, the exterior of which presents the aerodynamically rounded pan shape usual with such mirrors. A pivot joint 2 in the form of a so-called universal joint is disposed about centrally in the housing 1, 1', a mirror glass support 3 (FIGS. 1 to 4) or Y (FIG. 5, 6) or Y' (FIG. 7, 8), respectively, being arranged on the pivot joint 2 to pivot about two main pivot axes 4, 5 (FIG. 2). The mirror glass supports 3, 3', 3" are disposed on the plane of the open side 6 of the housing 1, 1'. They are configured as hollow pans, the mirror glass 7 being fixed in the vicinity of their open side 6. In the example of embodiment according to FIGS. 1 to 4, the mirror glass 7 is caught by an encircling narrow annular projection 8 projecting inwardly from the mirror glass support edge 10 that defines the open side 9 of the mirror glass support 3. On its rear the mirror glass 7 has a heating foil 11 glued on, which is supplied with current by electric leads 12.

Figure 3:
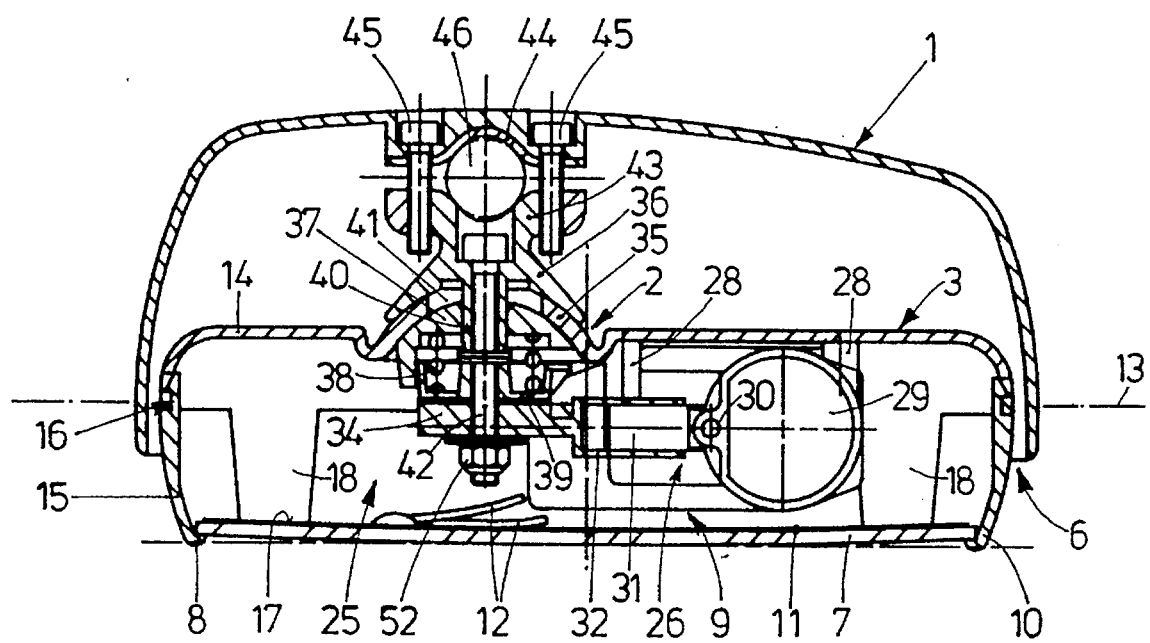
FIG. 3 is a horizontal section through the mirror along the section line III—III in accordance with FIG. 1.
Figure 4:
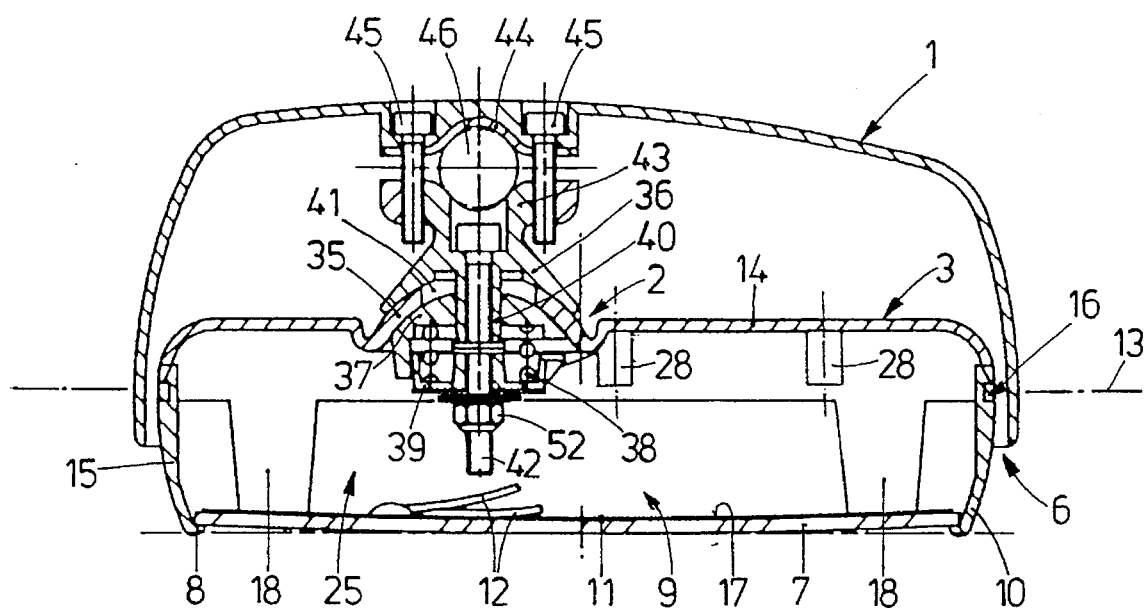
FIG. 4 is a horizontal section, analogous to FIG. 3, of a simple version without servomotors, of the rear view mirror.

On a plane 13 extending in parallel to the mirror glass plane, the mirror glass support 3 according to FIG. 3 and 4 is divided into a base member 14 and a frame member 15 placed thereon. As outlined—the frame member 15 carries the mirror glass 7 in the vicinity of its open side 9. The base member 14 is united with the frame member 15 by means of a locking 16 formed by complementary locking recesses and projections of the base member 14 and the frame member 15. Supporting webs 18 supporting the rear 17 of the mirror glass 7 extend from the base member 14 towards the rear 17 of the mirror glass 7. Thus, the mirror glass 7 is retained in a stable position between the annular projection 8 and the supporting webs 18.

Figure 5:
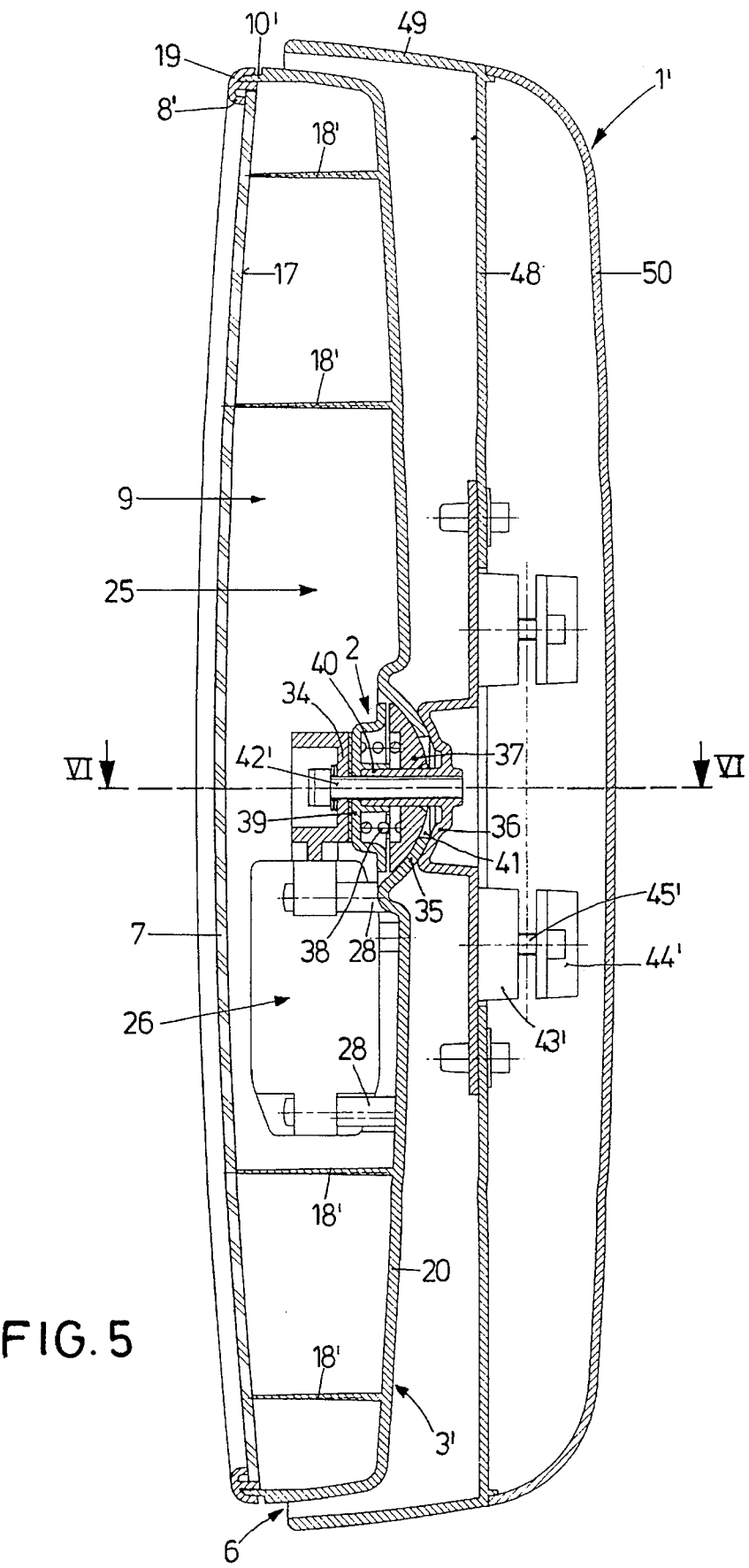
FIG. 5 is a vertical longitudinal section through a second embodiment of a rear view mirror.
Figure 6:
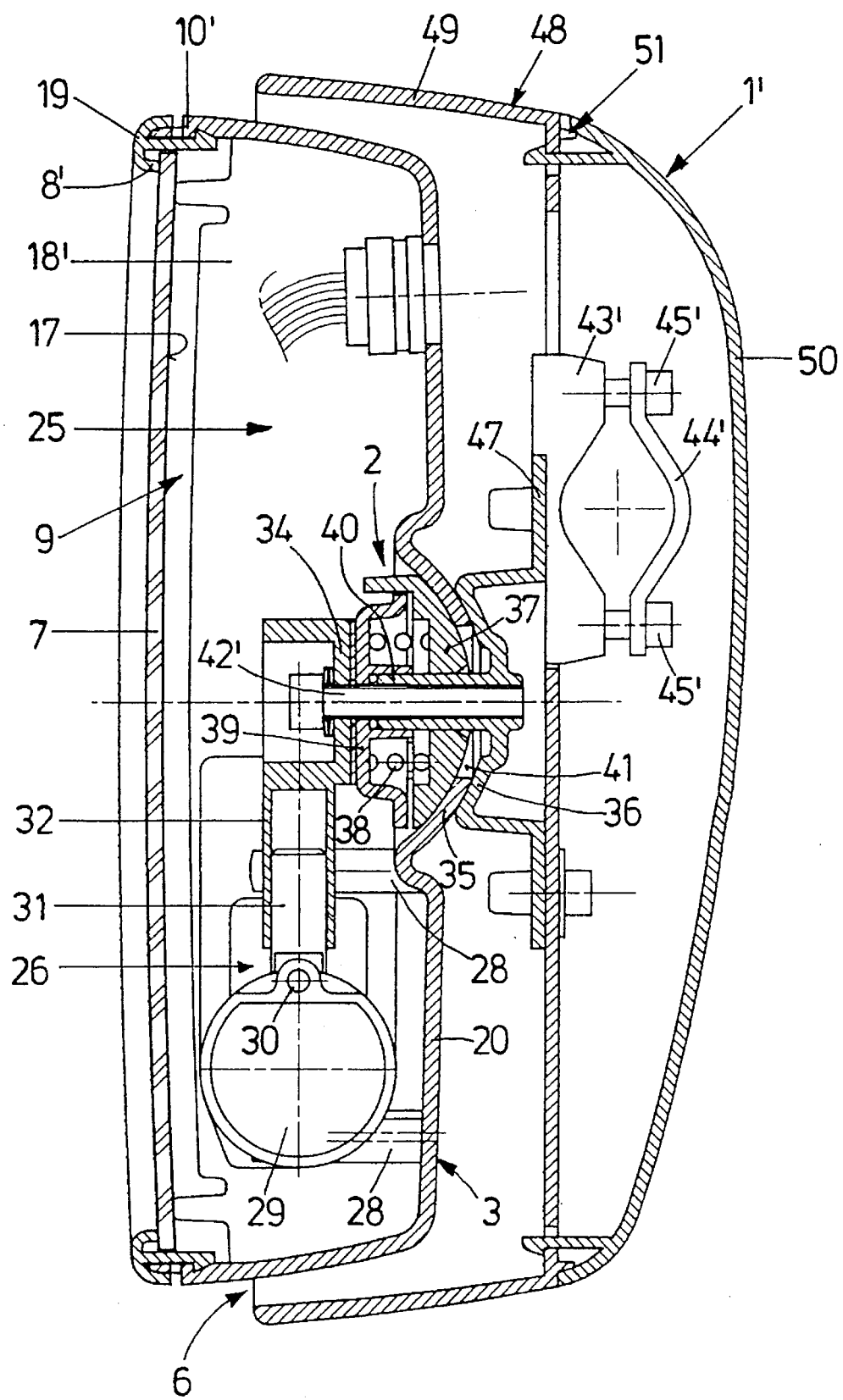
FIG. 6 is a horizontal section of the mirror along the section line VI—VI in accordance with FIG. 5.

In the example of embodiment shown in FIGS. 5 and 6, the mirror glass support 3' is made in one piece, the mirror glass 7 being fixed in the open side of the mirror glass support 3' by a retaining ring 19 slipped on to the edge 10' where it is appropriately fixed. The retaining ring 19 again has an annular projection 8' bent inwards and towards the mirror glass 7 and retaining the mirror glass 7. The rear 17 of the mirror glass 7 is again supported by supporting webs 18' integrally molded on the base 20 of the mirror glass support 3'.

Figure 7:
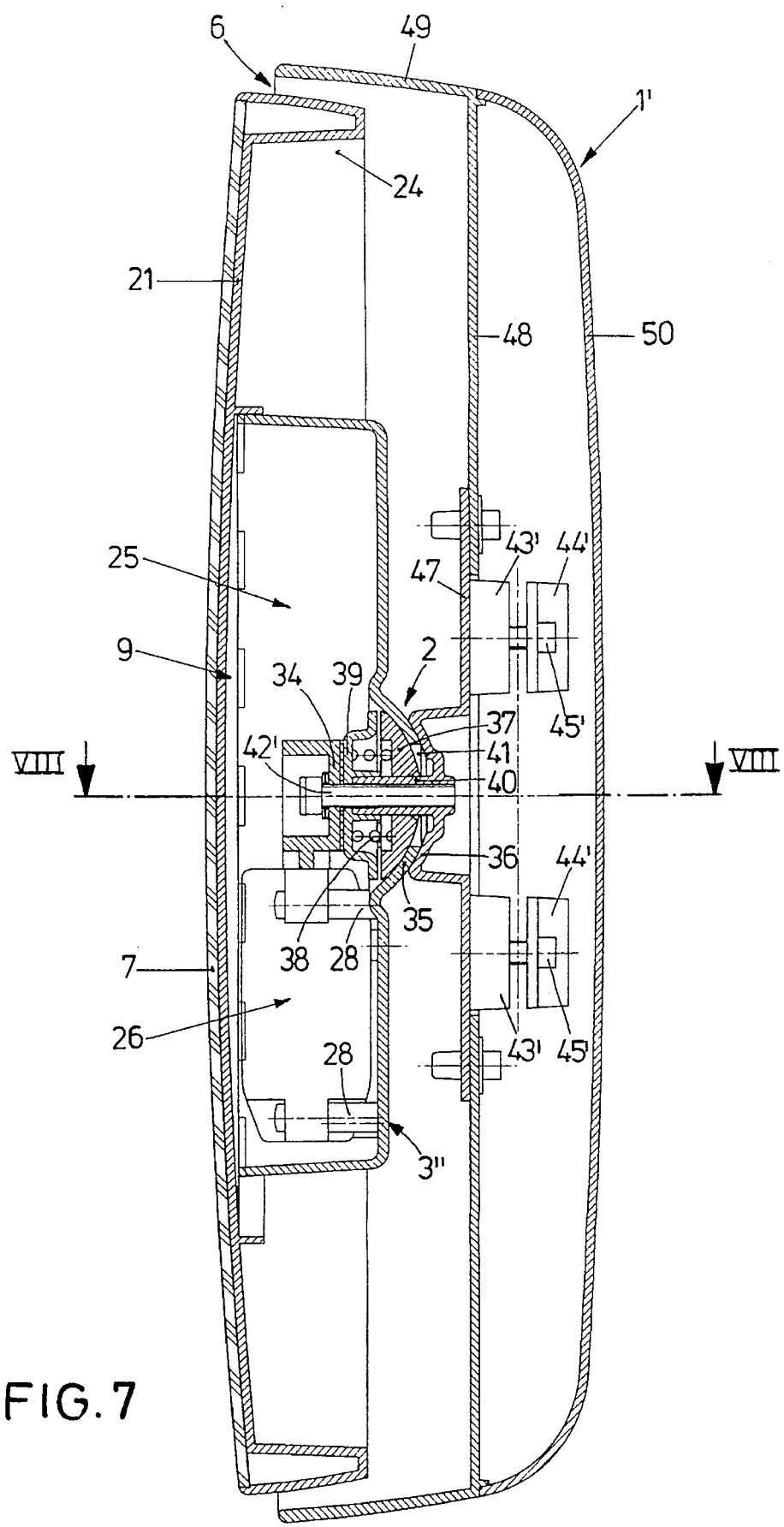
FIG. 7 is a horizontal longitudinal section through a third embodiment of a rear view mirror.
Figure 8:
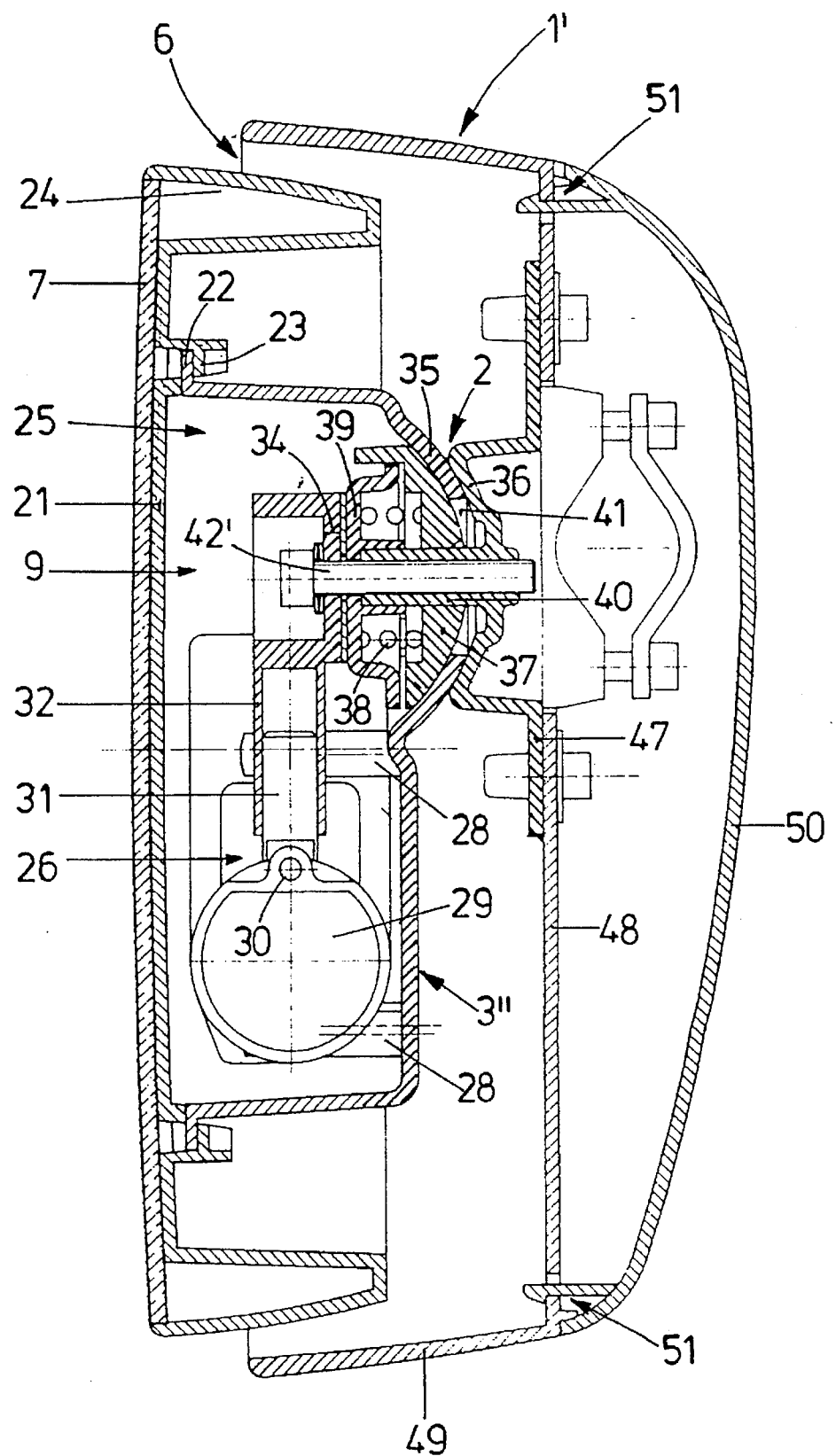
FIG. 8 is a horizontal section of the mirror along the section line VIII—VIII in accordance with FIG. 7.

In the example of embodiment shown in FIGS. 7 and 8, the pan-shaped mirror glass support Y' made in one piece only takes about half the height of the mirror glass 7 and about ⅔ of the latter's width. The fastening of the mirror glass 7 on the open side 9 of the mirror glass support 3" is made by a holding plate 21 on to which the rear 17 of the mirror glass 7 is glued. For joining the holding plate 21 to the mirror glass support 3", complementary projections 22, 23 are provided on the open side 9 of the mirror glass support 3" and on the rear of the holding plate 21, respectively, producing a so-called union of clamping engagement as it is the subject matter of U.S. patent application Ser. No. 08/245,952. Reference is made to this application so as to avoid unnecessary explanations.

Along its edge the holding plate 21 has a continuous collar 24 integrally molded thereon, by means of which the gap between the mirror glass 7 and the housing 1' is restricted to the dimension necessary for the mirror glass to pivot unimpeded in the housing 1'. In the examples of embodiment according to FIGS. 1 to 4 and 5, 6, respectively, this function is fulfilled by the side wall of the pan-shaped mirror glass support 2 or 3', respectively.

By reason of its design as a pan the mirror glass support 3, 3', 3" defines an installation chamber 25 into which to insert servomotors 26, 27. These servomotors 26, 27 usually are electric motors screwed on bearing sleeves 28 integrally molded on the base 20 of the mirror glass support 3, 3', 3". The servomotors 26, 27 are stationary on the mirror glass support 3, 3', 3".

The movable positioning member of the servomotors 26, 27 is formed by a crank disc 29 to which a connecting rod 31 is articulated by way of a crank joint 30. Each connecting rod 31 is guided within one of the bearing sleeves 32, 33 (FIG. 2) to be displaceable in the longitudinal direction and rotatable about the longitudinal axis of the latter. The two guide sleeves 32, 33 are integrally molded on a substantially triangular coupling plate 34, which is tightly united with the components, fixed to the housing 1, of the pivot joint 2 in a manner still to be specified. Consequently, the coupling plate 34 is supported, fixed to the housing 1.

On the one hand the pivot joint 2 designed as a spherical universal joint consists of a spherical bearing ring 35 formed integrally with the base member 14 and the base 20 of the mirror glass support 3 and 3', 3", respectively. The bearing ring 35 is clamped by frictional locking between a spherical bearing member 36 fixed to the housing 1 and located on the rear of the mirror glass support 3, 3', 3" and a spherical bearing cover on that side of the mirror glass support 3, 3', 3" turned towards the mirror glass 7. By way of a compression spring 38 the bearing cover 37 supports itself on an abutment cover 39 placed on a spacing sleeve 40. The latter projects centrally from the bearing member 36 and, by some clearance, passes through the inside opening 41 of the bearing ring 35 as well as the bearing cover 37. The abutment Cover 39 together with the coupling plate 34 and the spacing sleeve 40 are tightly screwed together. Consequently, the abutment cover 39 cooperates with the fastener 42 to form a support member, fixed to the housing 1, for the coupling plate 34.

In the example of embodiment according to FIGS. 3 and 4, the arrangement, fixed to the housing 1, of the bearing member 36 is realized in that the bearing member 36 is provided with a clamp bearing member 43 molded on integrally and cooperating with a clamp fitting 44. By means of the clamping device comprised of the clamp bearing member 43, the clamp fitting 44 and the fasteners 45, the mirror is clamped on to a holding pipe 46 passing through the housing 1 in the vertical direction and producing the union with the body (not shown) of the vehicle. By way of the fasteners 45 the housing 1 is simultaneously tightly joined to the clamp fitting 44 and thus to the bearing member 36.

In the embodiments according to FIGS. 5, 6 and 7, 8, respectively, the bearing member 36 is an integral part of a support plate 47 having two clamp bearing members 43' integrally molded on each with a corresponding the clamp fittings 44' and the fasteners 45' together form a clamping device for the fastening of the mirror on a mirror holding pipe (not shown in FIGS. 5 to 8). A pan-shaped housing base member 48, of which the continuous side wall 49 confines the volume swept by the pivoting of the mirror glass support 3', 3", is screwed on the support plate 47 from the side turned away from the mirror glass 7. From the rear of the base member 48 turned away from the mirror glass support 3', 3" a cover member 50 is locked on to the housing base member 48 (locking 51 in FIGS. 6, 8).

As can clearly be shown by a comparison of FIGS. 3 and 4, the mirrors shown in FIGS. 1 to 8 are structured such as to be provided with servomotors 26, 27 in the way of a unit assembly system or to be conceived as purely manually adjustable mirrors without these servomotors. If a remote-controlled adjustable luxury mirror is demanded, the servomotors 26, 27 are inserted in the mirror glass support 3, 3', 3" as explained in conjunction with FIGS. 1 to 3 and 5 to 8. In this case, the servomotor 26 serves to pivot the mirror glass support 3, 3', 3" about the vertical main pivot axis 4, whereas the servomotor 27 serves to pivot the mirror glass support 3, 3', 3" about the horizontal main pivot axis 5. Now, if for instance the servomotor 26 is actuated for the crank disc 29 to rotate clockwise, then the connecting rod 31 supports itself on the guide sleeve 32 fixed to the housing 1 so that the mirror glass support 3 is also pivoted clockwise about the vertical main pivot axis 4. To compensate the change of distance between the guide sleeve 32 fixed to the housing 1 and the crank joint 30, the connecting rod 31 moves out of the guide sleeve 32 by the corresponding length.

If the mirror, as a simple version, is only to be pivoted manually, the servomotors 26, 27 only have to be omitted together with the crank disc and the connecting rod and the coupling plate 34. Apart from that the complete structure of the mirror can be maintained. For the assembly of the pivot joint 2, the nut 52 (FIG. 4) only has to be screwed further on the fastener 42 or, respectively, the fastener 42' has to be screwed further into the spacing sleeve 40 (FIG. 5 to 8). Such a manually adjustable mirror can very easily be retrofitted with the servomotors 26, 27.

What is claimed is:

1. A rear view mirror for motor vehicles, in particular for commercial vehicles, comprising a housing supporting a mirror glass support;

a mirror glass support (3, 3', 3") having a base member and a frame means to hold a mirror glass spaced from said base, said base member and frame means defining an installation chamber (25);

a mirror glass (7) disposed said frame means to cover said installation chamber, said installation chamber being sized to hold at least one servomotor to provide for a remote-controlled pivotal adjustment of the mirror glass support (3, 3', 3") and thus of the mirror glass in relation to the housing;

a spherical universal joint, in which a spherical bearing ring (35) molded on the mirror glass base member is clamped by frictional locking between a spherical bearing member (36) fixed to the housing (1) and disposed on the rear of the mirror glass support (3, 3', 3") and a spherical bearing cover (37) on the inside of the mirror glass support (3, 3', 3"), the bearing cover (37) supporting itself on an abutment member (39) fixed to the housing (1) and disposed on the inside of the mirror glass support (3, 3', 3");

at least one servomotor comprising a movable positioning element being arranged in said installation chamber to be stationary relative to the mirror glass support wherein the movable positioning element is linked with a coupling plate (34), fixed to the housing (1), by way of a slider crank mechanism comprising a crank disk (29) linked with the coupling plate (34) by way of a connecting rod (31) articulated on the crank disc (29) and guided in a guide sleeve (32, 33) of the coupling plate (34), said coupling plate being attachable on the abutment member (39, 42, 42') in a manner fixed to the housing (1).

2. A rear view mirror according to claim 1, wherein on a plane (13) extending parallel to a main plane of the mirror glass (7), the mirror glass support (3) is divided into a base member (14) and a frame member (15) placed thereon and carrying the mirror glass (7).

3. A rear view mirror according to claim 1, wherein the rear view mirror is feasible, in the way of a unit assembly system, as a manually adjustable mirror by the at least one servomotor (26, 27) being omitted, or as a remote-controlled adjustable mirror by the at least one servomotor (26, 27) being placed in the installation chamber (25) of the mirror glass support (3, 3', 3").

4. A rear view mirror for motor vehicles in particular for commercial vehicles, comprising:

a housing supporting a mirror glass support;

a mirror glass support having a base member and a frame means to hold a mirror glass spaced from said base member, said base member and frame means defining an installation chamber;

a mirror glass disposed on said frame means to cover said installation chamber, said installation chamber being sized to hold at least one servomotor to provide for a remote-controlled pivotal adjustment of the mirror glass support and thus of the mirror glass relative to the housing;

a spherical universal joint, in which a spherical bearing ring molded on the mirror glass base member is clamped by frictional locking between a spherical bearing member fixed to the housing and disposed on the rear of the mirror glass support and a spherical bearing cover on the inside of the mirror glass support the bearing cover supporting itself on an abutment member fixed to the housing and disposed on the inside of the mirror glass support;

at least one servomotor comprising a movable positioning element being arranged in said installation chamber to be stationary relative to the mirror glass support wherein the movable positioning element is articulately linked with a coupling plate, fixed to the housing, by way of a slider crank mechanism, said coupling plate being attachable on the abutment member in a manner fixed to the housing.

5. A rear view mirror according to claim 4, wherein the mirror glass support is a hollow pan open towards the mirror glass (7).

6. A rear view mirror according to claim 4, wherein said frame means includes a frame member and wherein on a plane extending parallel to a main plane of the mirror glass, the mirror glass support (3) is divided into the base member and the frame member placed on the base member, said frame member carrying the mirror glass.

7. A rear view mirror according to claim 4, wherein the rear view mirror is feasible, in the way of a unit assembly system, as a manually adjustable mirror by the at least one servomotor being omitted, or as a remote-controlled adjustable mirror by the at least one servomotor being placed in the installation chamber (25) or the mirror glass support.

8. A rear view mirror according to claim 4 wherein the slider crank mechanism comprises a crank disc linked with the coupling plate by way of a connecting rod (31) articulated on the crank disc and guided in a guide sleeve of the coupling plate.

9. A rear view mirror according to claim 4 wherein the mirror glass comprises a from and a rear and wherein supporting webs projecting towards the mirror glass are molded in the mirror glass support to support the rear of the mirror glass.

10. A rear view mirror for motor vehicles, in particular for commercial vehicles comprising:

a housing supporting a mirror glass support;

a mirror glass support having a base member and a frame means to hold a mirror glass spaced from said base member, said base member and frame means defining an installation chamber, a mirror glass disposed on said frame means to cover said installation chamber, the mirror glass comprises a from and a rear, supporting webs being molded in the mirror glass support and projecting towards the mirror glass to support the rear of the mirror glass;

said installation chamber being sized to hold at least one servomotor to provide a remote controlled pivotable adjustment of the mirror glass support and mirror glass relative to the housing;

at least one servomotor comprising a movable positioning element is arranged in the installation chamber of the mirror glass support to be stationary relative to the latter and wherein the movable positioning element is articulately coupled with a support member, which is stationary relative to the housing;

a spherical universal joint, in which a spherical bearing ring molded on the base member is clamped by frictional locking between a spherical bearing member fixed to the housing and disposed on the rear of the mirror glass support, and a spherical bearing cover, the bearing cover positioned in said insulation chamber supporting itself on an abutment member fixed to the housing and disposed in said insulation chamber support, which abutment member is simultaneously the support member for the movable positioning element of the at least one servomotor.

11. A rear view mirror according to claim 10, wherein the mirror glass support (3, 3', 3") defines a hollow pan open towards the mirror glass (7).

12. A rear view mirror according to claim 10 wherein the frame means includes a frame member and, wherein on a plane (13) extending parallel to a main plane of the mirror glass (7), the mirror glass support (3) is divided into the base member (14) and the frame member (15) placed on the base member, said frame member carrying the mirror glass (7).

13. A rear view mirror according to claim 10, wherein a holding plate (21), on which the mirror glass (7) is fixed, is attachable to the mirror glass support (3") for the fastening of the mirror glass (7) to the mirror glass support (3").

14. A rear view mirror according to claim 10, wherein the movable positioning element of the at least one servomotor is linked with a coupling plate, fixed to the housing, by way of a slider crank mechanism, the coupling plate being attachable on the abutment member in a manner fixed to the housing.

15. A rear view mirror according to claim 10, wherein the at least one slider crank mechanism comprises a crank disc linked with the coupling plate by way of a connecting rod articulated on the crank disc and guided in a guide sleeve of the coupling plate.

16. A rear view mirror according to claim 10 for motor vehicles, in particular wherein the rear view mirror is feasible, in the way of a unit assembly system, as a manually adjustable mirror by the at least one servomotor being omitted, or as a remote-controlled adjustable mirror by the at least one servomotor being placed in the installation chamber of the mirror glass support.

17. A rear view mirror according to claim 16, wherein a holding plate (21), on which the mirror glass (7) is fixed, is attachable to the mirror glass support (3") for the fastening of the mirror glass (7) to the mirror glass support (3").

18. A rear view mirror for motor vehicles, in particular for commercial vehicles comprising;

a housing supporting a mirror glass support;

a mirror glass support having a base member and a frame means to hold a mirror glass spaced from said base member, said base member and frame means defining an installation chamber;

a mirror glass disposed on the said frame means to cover said installation chamber;

a pivot joint connected to said mirror glass support and said housing, wherein said pivot joint allows for a pivotal movement of said mirror glass support relative to said housing;

at least one servomotor arranged in the installation chamber of the mirror glass support to be stationary relative to said mirror glass support, said servomotor to provide for a remote controlled pivotal adjustment of the mirror glass support and mirror glass relative to the housing via a slider crank mechanism comprising a crank disk linked with a coupling plate by way of a connecting rod articulated on the crank disk and guided in a guide sleeve of the coupling plate wherein movement of said crank disc causes a pivotal adjustment of the mirror glass support and mirror glass relative to the housing.

* * * * *

UNITED STATES PATENT AND TRADEMARK OFFICE
CERTIFICATE OF CORRECTION

PATENT NO. : 5,583,703
DATED : December 10, 1996
INVENTOR(S) : Heinrich Lang, et al It is certified that error appears in the above-indentified patent and that said Letters Patent is hereby corrected as shown below:

Column 6, lines 21 and 33 change "from" to --front--.

Signed and Sealed this

Twenty-first Day of October 1997

Attest:

BRUCE LEHMAN

Attesting Officer

Commissioner of Patents and Trademarks